United States Patent [19]
Iihoshi et al.

[11] Patent Number: 4,893,246
[45] Date of Patent: Jan. 9, 1990

[54] APPARATUS FOR DISPLAYING TRAVEL PATH

[75] Inventors: Akira Iihoshi; Yukinobu Nakamura; Shinichiro Yasui, all of Saitama, Japan

[73] Assignee: Honda Giken Kogyo Kabushiki Kaisha, Tokyo, Japan

[21] Appl. No.: 130,680

[22] Filed: Dec. 9, 1987

[30] Foreign Application Priority Data

Dec. 15, 1986 [JP] Japan ................................ 61-298353

[51] Int. Cl.$^4$ ............................................. G06F 15/50
[52] U.S. Cl. .................................... 364/449; 340/988; 340/995; 73/178 R
[58] Field of Search ................ 364/443, 444, 449, 521; 340/988, 990, 995; 73/178 R; 342/451

[56] References Cited

U.S. PATENT DOCUMENTS

| 4,511,973 | 4/1985 | Miura et al. | 364/449 |
| 4,646,089 | 2/1987 | Takanabe et al. | 364/449 |
| 4,677,561 | 6/1987 | Akama et al. | 364/449 |
| 4,677,562 | 6/1987 | Uota et al. | 364/449 |
| 4,796,189 | 1/1989 | Nakayama et al. | 340/995 |

Primary Examiner—Gary Chin
Attorney, Agent, or Firm—Lyon & Lyon

[57] ABSTRACT

An apparatus for displaying a travel path of a running body which apparatus includes sensors and a central processing unit (a) for calculating a distance of approach of the running body relative to a target to produce data concerning the approach, (b) for comparing the old and new data and thus successively, renewing the data concerning the approach, thereby obtaining a closest distance of the running body relative to the target, and (c) for deciding that the running body has passed the target when said closest distance is within a predetermined range.

4 Claims, 6 Drawing Sheets

APPARATUS FOR DISPLAYING TRAVEL PATH

BACKGROUND OF THE INVENTION

1. Field of the Invention

The present invention relates to a travel path displaying apparatus in which a current location and a path of travel of a running body, such as automobile, (hereinafter referred to as a vehicle) are displayed on a display screen which has a map previously displayed thereon.

2. Description of the Prior Art

In an attempt to provide a driving guidance system to prevent a driver of a vehicle from loosing his way in driving, for example in a strange place, from his desired travel path, there has been developed a travel path displaying apparatus including a distance detector for detecting a distance of travel depending upon a running speed of the vehicle and a direction detector for detecting a running direction and an amount of change of direction, from time to time, wherein a current location of the vehicle on two-dimensional coordinates is successively computed from the respective results of detections effected by the above-mentioned detectors and the location thus computed is memorized and displayed in the form of a constantly changing pattern of continuous point informations on a display screen having a map including roads or the like previously displayed thereon, so that the driver may confirm the current location of his vehicle.

In such travel path displaying apparatus, it has been a practice previously to set target points, such as crossing points where the vehicle is to be turned to the right or the left, on a desired travel course from a starting point to a goal on the map, so that the vehicle may be guided in a smooth manner during traveling to the goal.

In such apparatus, however, there is a case where the travel path of the vehicle displayed on the display screen misses the target previously set on the map, owing to a difference between the shape of the roads displayed on the map and the actual shape of the roads. In order to distinguish this case from an erroneous running state where the vehicle is traveling on a path other than the desired travel path, it is desirable to continue the driving guidance on the assumption that the vehicle has passed the target, when the travel path, which has missed the target, satisfies a predetermined condition.

In order to assume that the vehicle has passed the target, it may be possible to set a circular area having a predetermined radius around the target position which has been previously set and registered on the coordinates and to detect the fact that the vehicle comes into said circular area, thereby deciding that the vehicle has passed the target. In this case, where the decision of passing of the vehicle through the target point is made only on the fact that the travel path comes within the predetermined area, if roads in this area are complicated and form a plurality of close crossings, it may be erroneously decided that the vehicle has passed the target at a place other than the target.

OBJECT OF THE INVENTION

In view of the above, it is an object of the present invention to provide an apparatus for displaying a travel path of a vehicle in which a target is set on a desired running course on a map displayed on a display screen and it is possible to make a precise decision, at any time, concerning passing of the vehicle through the target.

SUMMARY OF THE INVENTION

In order to attain the above object, the present invention provides an apparatus for displaying a travel path of a vehicle which includes means for calculating a distance of approach of the vehicle relative to a target to produce data concerning the approach, means for comparing the old and new data and thus successively renewing the data concerning the approach, thereby obtaining a closest distance of the vehicle relative to the target, and means for deciding the vehicle has passed the target when said closest distance is within a predetermined range.

In order to attain a more precise decision of passing through a target, the present invention provides an apparatus which further includes means for setting a running direction of a vehicle at the target point at the time when the target point is set on the desired running course on the map, means for obtaining a difference between the running direction of the vehicle set at the target point and an actually detected running direction of the vehicle when it has been decided that the closest distance of the vehicle relative to the target is within the predetermined range, and means for deciding that the vehicle has passed the target when the difference between the running directions is within a predetermined range.

DETAILED DESCRIPTION OF THE PREFERRED EMBODIMENT

Now, the description will be made of the preferred embodiments of the present invention, with reference to the accompanying drawings.

Figure 1:
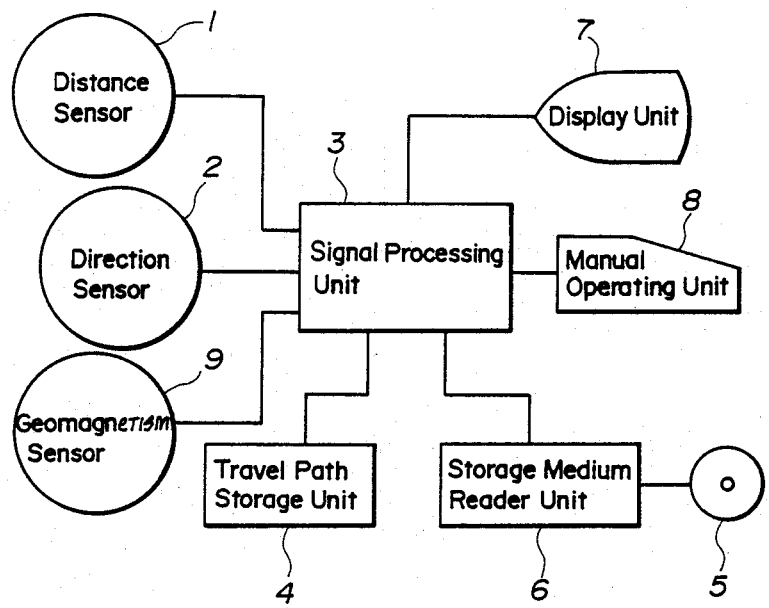
FIG. 1 is a block diagram showing an embodiment of the travel path displaying apparatus according to the present invention.

FIG. 1 shows an example of the fundamental construction of the travel path displaying apparatus according to the present invention. The essential constituent factors include a distance sensor 1 of photoelectric, electromagnetic, mechanical contact type or the like, for generating pulse signals at every unit distances, depending on the rotation of the wheel of the vehicle, for example, a direction sensor 2 for generating signals proportional to the amount of change of running direction of the vehicle which consists of a gyroscope, for example, for detecting the change of angular velocity in the yawing direction, a signal processing unit 3 which serves to count the number of the pulse signals sent from the distance sensor 1 to measure the distance of travel of the vehicle and also serves to decide the change of the running direction of the vehicle on the basis of the output signal of said direction sensor 2 to successively compute the current location of the vehicle on the two-dimensional coordinates at every unit distance of travel of the vehicle, said unit including a CPU for effecting centralized control of the whole system, a programming ROM, a controlling RAM, etc., a travel path storing means (RAM) 4 for successively storing the data of the constantly changing location on the two-dimensional coordinates obtained by said signal processing unit and holding said data as finite and continuous location information corresponding to the current location of the vehicle, a map information storage medium 5 in which a plurality of file units of map information concerning each of a plurality of areas and on each reduction scale are previously stored, a storage medium reader unit 6 for selectively reading out the desired map file from the storage medium 5, a display unit 7 for successively renewing and displaying the current location of the vehicle, the path of travel and the current running direction and the other information on the same display screen on the basis of the location data stored in the storage unit 4, a manual operating unit 8 for giving a command for operation to the signal processing unit 3 and for effecting various operations including selection of the map to be displayed on the display unit 7, setting of the starting point of the vehicle on the displayed map, the target points, the goal point, change of directions of the displayed map and the travel path, shifting of the displayed position, change of the setting of the displayed form such as the partial enlargement of the display of the map and the travel path, selection of the reduction scale and the like, and a geomagnetism sensor 9 for sensing the geomagnetism to detect an absolute azimuth.

Figure 2:
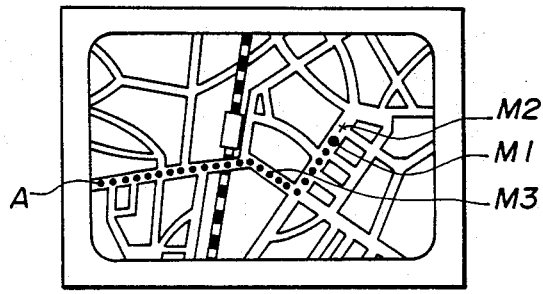
FIG. 2 is a diagram showing an example of the content of display produced by the travel path displaying apparatus.

In the construction as descrived above, the selectively read out map is displayed on the display screen of the display unit 7, while the current location on the two-dimensional coordinates is successively computed, as the vehicle travels from the starting point set on the map, by means of the signal processing unit 3 on the previously set reduction scale of the map and the result of the computation is successively sent to the travel path storage unit 4, so that the content of the storage is renewed, constantly read out and sent to the display unit 7. As shown in FIG. 2, the display unit 7 has a display mark M1 indicating the current location of the vehicle on the map displayed on the display screen, a display mark M2 indicating the running direction of the vehicle at the current location and display marks M3 indicating the travel path from the starting point to the current location. These marks simulate the running status of the vehicle. At this stage, the display of the travel path is rotated in accordance with the signal detected by the geomanetism sensor 9, under the control of the signal processing unit 3, so that the travel path of the vehicle may be displayed on the display screen with a proper direction corresponding to the azimuth of the map displayed on the display screen.

Figure 3:
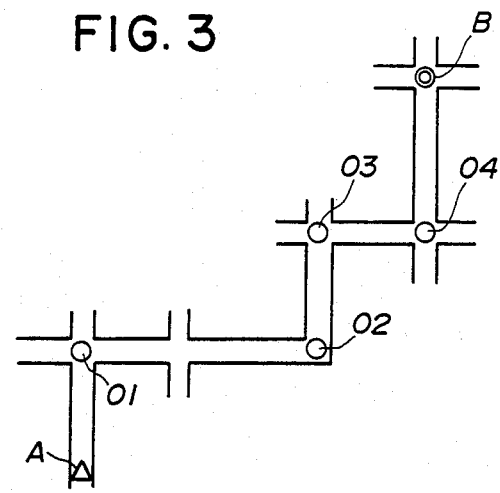
FIG. 3 is a diagram showing an example of the desired running course on the map having a plurality of targets set thereon.

A cursor of the manual operating unit 8, can be operated to set the target points 01-04, as desired, on the desired travel course from the starting point A to the goal B, as shown in FIG. 3. The data concerning the positions of the set target points 01-04 on the two-dimensional coordinates is registered in the inner memory of the signal processing unit.

Figure 4:
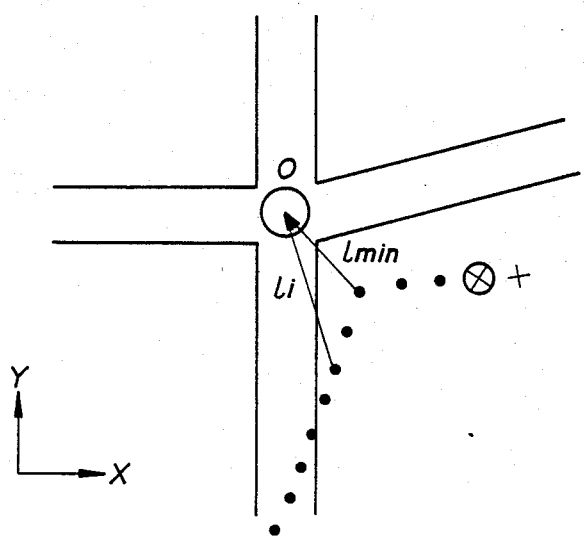
FIG. 4 is a diagram showing an example of the travel path of the vehicle relative to the target set on the map.

In accordance with the present invention, when the vehicle turns to the right at the crossing on the map having the target point O set thereon, as shown in FIG. 4, for example, the closest distance 1 min of the vehicle relative to the target O is computed by the signal processing unit 3 and the closest distance 1 min thus computed is compared with a predetermined distance K (for example, 600 m). If 1 min<K, it is decided that the vehicle passes the target.

The distance li between the current location (xi,yi) of the vehicle, which constantly changes as the vehicle runs, and the registered location (xo, yo) of the target point O is successively computed, and the new data li and the old data li−1 are compared with each other. As long as the relation li<li−1 exists, that is, as long as the vehicle is in its approaching state relative to the target O, the approaching distance li is successively renewed.

Then, the relation li>li−1 comes into effect, and the most close distance 1 min is determined by the value li when the vehicle moves away from the target O. The value of li is given by the following formula:

$$\sqrt{(xi-xo)^2+(yl-yo)^2} \qquad (1)$$

Figure 5:
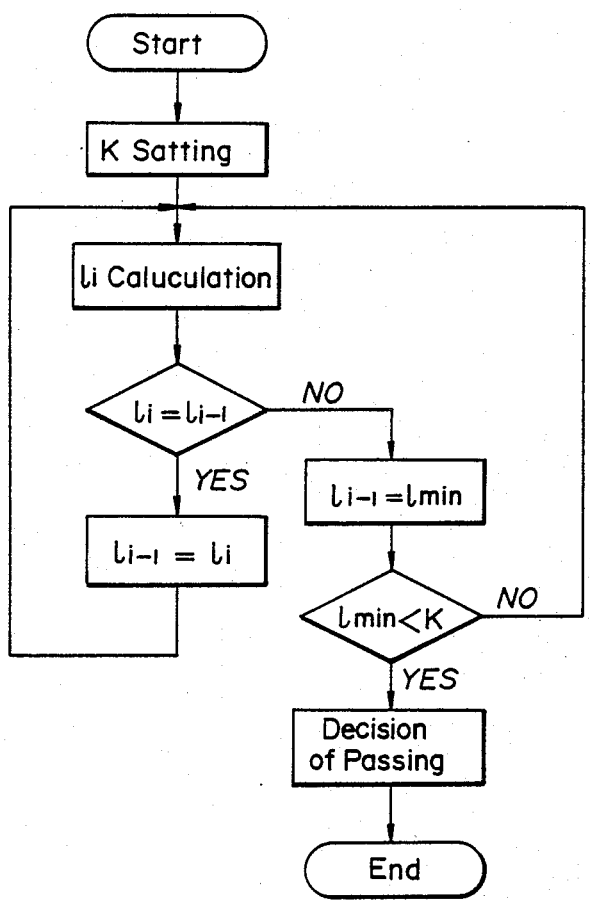
FIG. 5 is a flow chart showing the process of deciding that the vehicle has passed the target, according to an embodiment of the present invention.

FIG. 5. is a flow chart showing the process of deciding that the vehicle has passed the target, in the signal processing unit 3.

If desired, a buzzer or voice warning device may be provided to inform the driver of the fact that the vehicle has passed the target, under the control of the signal processing unit 3, when the decision of passing the target had been made.

As described above, in the travel path displaying apparatus according to the present invention the approaching distance li relative to the target O is constantly compared with the old data and renewed to obtain the closest distance 1 min, and the decision of passing the target is made on the basis of the closest distance thus obtained. Accordingly, even if a crossing is located near the target O, an erroneous decision cannot occur so long as the vehicle is approaching the target O. Furthermore, because the decision of passing the target point is made depending upon the approaching distance of the vehicle relative to the target point O, it is possible to make the decision of passing the target point independently of the entering direction of the vehicle into the target area.

Figure 6:
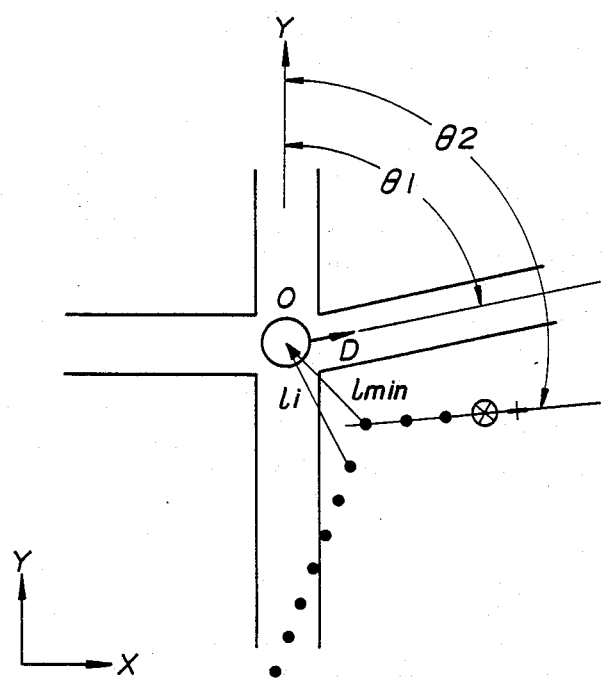
FIG. 6 is a diagram showing an example of the travel path of the vehicle relative to the target in which the running direction at the target is set.

The apparatus according to the present invention may be modified as illustrated in FIG. 6 from that shown in FIG. 4. According to this embodiment, at the time of setting the target point O on the desired running course on the map displayed on the display screen, a running direction D of the vehicle is also set by a mark by the manual operating unit 8, as shown in FIG. 6. The decision of the vehicle passing the target point is made not only on the basis of the approaching distance of the vehicle relation to the target point O, as described above, but also on the basis of the relation between the actual running direction of the vehicle and the running direction D set at the target point O. The data of the angle θ1 of the set running direction D relative to the Y axis is registerd in the inside memory of the signal processing unit 3.

The decision of passing on the basis of the approaching distance as well as the relation between the actual running direction and the running direction D set at the target O may be carried out by the following process. At the time when it has been decided that the closest distance 1 min of the vehicle relative to the target O is within a range of the predetermined distance K, as described above, a difference $|\theta 1-\theta 2|$ between the angle $\theta 1$ of the running direction D set at the target O and the angle $\theta 2$ of the actual running direction is obtained and it is compared with a predetermined angle $\psi$(for example 30°) which has been previously set. It is decided that the vehicle has passed the target when $|\theta 1-\theta 2|<\psi$. The angle $\theta 2$ of the actual running direction of the vehicle can be decided on the basis of the coordinates data (x1, y1) of the closest position of the vehicle relation to the target O and the coordinates data (xi,yi) of the current position of the vehicle at the time after it has been decided that the closest distance 1 min is within the range of the predetermined distance K, according to the following formula:

$$\theta 2 = 90° - \tan^{-1}\{(yi-y1)/(xi-x1)\} \quad (2)$$

Figure 7:
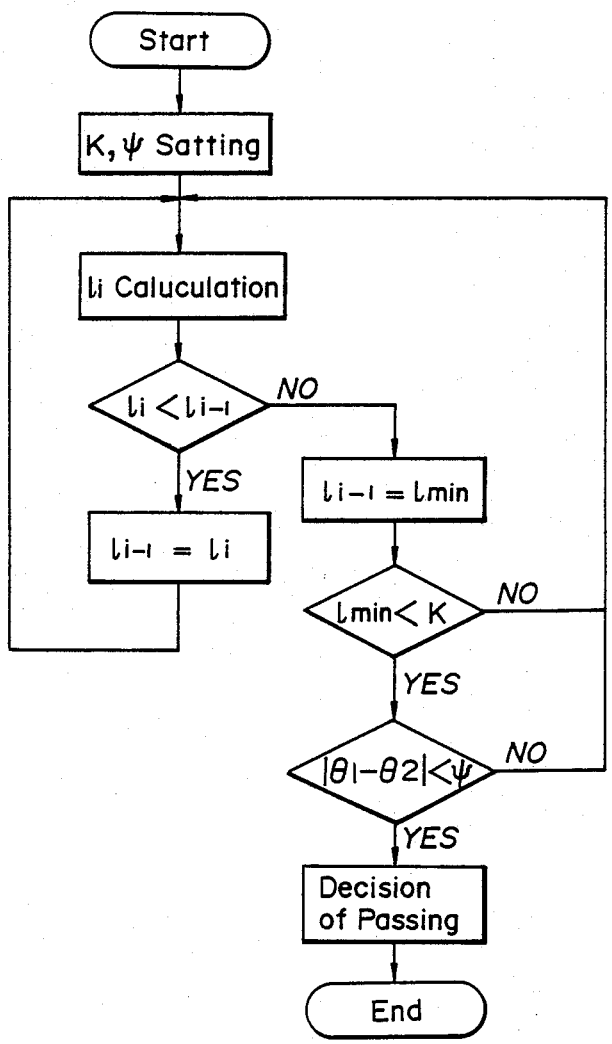
FIG. 7 is a flow chart showing the process of deciding that the vehicle has passed the target, according to another embodiment of the present invention.

FIG. 7 is a flow chart showing the process of decision in this case.

According to this embodiment, the decision is made on the basis of whether the closest distance 1 min of the vehicle relation to the target O is within the range of the predetermined distance K or not, as well as whether the running direction of the vehicle at this moment substantially coincides with the previously set running direction D or not, so that more precise decision of passing can be effected. Furthermore, the more optimum guidance of the vehicle from the starting point to the goal can be effected, by setting the mark indicating the running direction D along which the vehicle is to advance.

In a further embodiment of the present invention, when it has beed decided by the signal processing unit 3 that the closest distance 1 min of the vehicle relation to the target O is within the range of the predetermined distance K, as described above, a distance of travel d from the closest position is decided and it is compared with a predetermined distance L (for example, 100 m). After it is comfirmed that d>L, it is decided that the vehicle has passed the target or not, depending upon whether the abovementioned cordition $|\theta 1-\theta 2|<\psi$ is satified or not. The distance of travel d of the vehicle from the closest position relative to the target O is given, on the basis of the coordinates data (x1, y1) of the closest position and the coordinates data (xi, yi) of the current location of the vehicle, according to the following formula;

$$d = \sqrt{(xi-x1)^2 + (yi-y1)^2} \quad (3)$$

Figure 8:
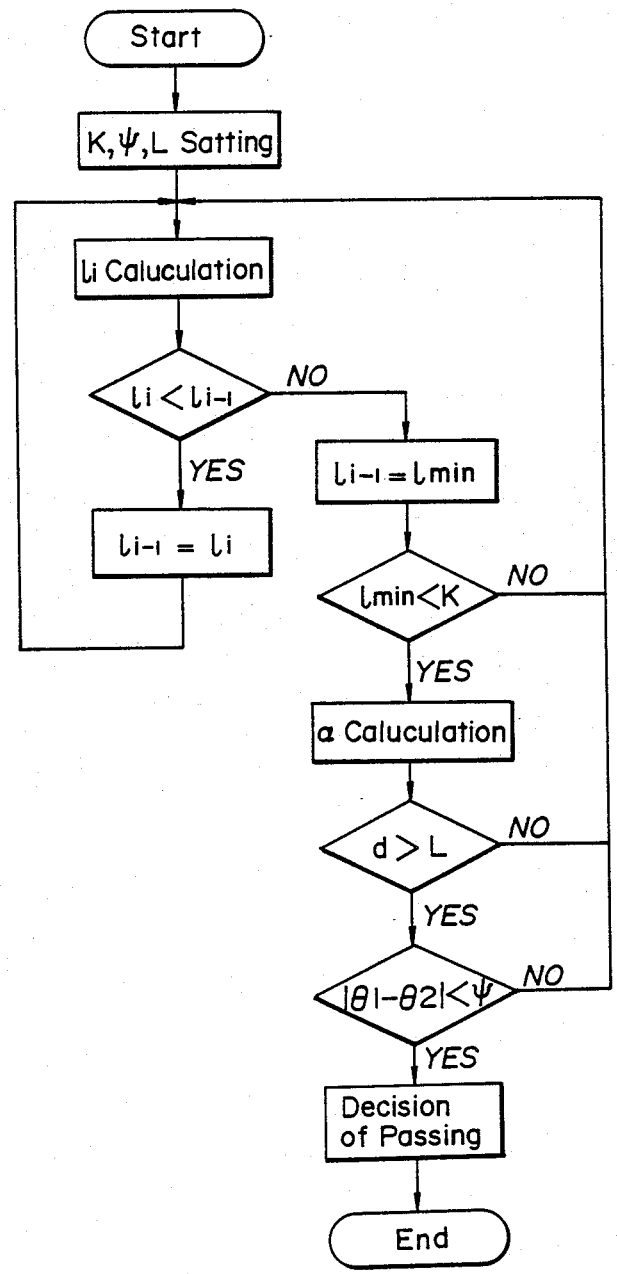
FIG. 8 is a flow chart showing a further embodiment of the present invention.

FIG. 8 is a flow chart showing the process of deciding passing of the target in this case.

According to this embodiment, it is confirmed that the vehicle has travelled over a predetermined distance L from the closest position relation to the target point O, before the decision of the running direction of the vehicle. Accordingly, when the vehicle turns around a rotary at the target position or enters into a service station to supply fuel at the target position, for example, an erroneous decision of the running direction is prevented and it is possible to effect the precise decision of the running direction during steady state of running toward the next target.

As described above, the present invention provides an apparatus for displaying a travel path of a vehicle in which target point or points are set on a desired running course displayed on a display screen, characterized in that it is decided that the vehicle has passed the target point, by the process of determining the closest distance of the vehicle relative to the target point and confirming that said closest distance is within a range of a predetermined distance, or by the above process combined with an additional process of confirming that a running direction of the vehicle after reaching the closest position relative to the target point substantially coincides with a running direction which has been previously set at the target point. This apparatus has a superior advantage in that it always enables the system to effect a precise decision of passing a target point, thereby providing optimum guidance for a vehicle running along a desired running course.

We claim:

1. An apparatus for displaying a travel path of a moving body in which a current location of the moving body during travelling on two-dimensional coordinates is successively computed and the current location of the moving body is displayed on a map and successively renewed according to data of the current location thus computed, comprising:

means for setting at least one target point on a desired running course on the map; and means for deciding that the moving body has passed the target point by a determination that a closest distance of the current location of the moving body relative to the target point, the closest distance having been obtained by computation of data of position of the target point and data of the current location, is within a predetermined distance.

2. An apparatus for displaying a travel path of a moving body during travel on two-dimensional coordinates is successively computed and the current location is displayed on a map and successively renewed according to data of the current location thus computed, comprising:

means for setting at least one target point on a desired running course on the map;

means for setting a running direction of the moving body at the target point; and means for deciding that the moving body has passed the target point by a first determination that a closest distance of the current location of the moving body relative to the target point, the closest distance having been obtained by computation of data of position of the target point and data of the current location, is within a predetermined distance and by a second determination that a difference in angle between an actual running direction of the moving body after reaching a closest position relative to the target point and a running direction previously set at the target point is within a predetermined angle.

3. An apparatus for displaying a travel path of a moving body according to claim 2 in which the decision is made on the second determination after the moving body reaches a closest position relative to the target point after the moving body has travelled for a predetermined distance passed the closest position.

4. A method for displaying a travel path of a moving body in which a current location of the moving body during travelling on two-dimensional coordinates is successively computed and the current location of the moving body is displayed on a map and successively renewed according to data of the current location thus computed, the method comprising the steps of:

setting at least one target point on a desired running course on the map; and deciding that the moving body has passed the target point by (1) obtaining a closest distance of the current location of the moving body relative to the target point by computation of data of position of the target point and data of the current location and (2) determining that the closest distance is within a predetermined distance.

* * * * *